(12) United States Patent
Brittenham et al.

(10) Patent No.: US 9,197,431 B2
(45) Date of Patent: *Nov. 24, 2015

(54) MATCHING AN AUTONOMIC MANAGER WITH A MANAGEABLE RESOURCE

(75) Inventors: Peter J. Brittenham, Pittsboro, NC (US); Edward C. Snible, Bronx, NY (US); John W. Sweitzer, Austin, TX (US); Mark D. Weitzel, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 533 days.

This patent is subject to a terminal disclaimer.

(21) Appl. No.: 13/488,598

(22) Filed: Jun. 5, 2012

(65) Prior Publication Data

US 2012/0240127 A1 Sep. 20, 2012

Related U.S. Application Data

(63) Continuation of application No. 11/535,680, filed on Sep. 27, 2006, now Pat. No. 8,244,866.

(51) Int. Cl.
*H04L 12/24* (2006.01)

(52) U.S. Cl.
CPC ................ *H04L 12/24* (2013.01); *H04L 41/00* (2013.01); *H04L 41/0869* (2013.01); *H04L 41/12* (2013.01)

(58) Field of Classification Search
CPC ............ H04L 12/5695; H04L 12/2602; H04L 41/0893; H04L 41/042; H04L 67/10; H04L 43/16; H04L 47/781

USPC .................. 709/203, 223, 224, 225, 226, 229
See application file for complete search history.

(56) References Cited

U.S. PATENT DOCUMENTS

| | | | |
|---|---|---|---|
| 5,826,239 A * | 10/1998 | Du et al. | 705/7.26 |
| 6,466,980 B1 | 10/2002 | Lumelsky et al. | |
| 6,578,106 B1 | 6/2003 | Price | |
| 6,965,938 B1 * | 11/2005 | Beasley et al. | 709/229 |
| 7,072,900 B2 * | 7/2006 | Sweitzer et al. | 1/1 |
| 7,403,901 B1 * | 7/2008 | Carley et al. | 705/2 |
| 7,444,355 B1 * | 10/2008 | Clark et al. | 1/1 |
| 7,457,824 B1 * | 11/2008 | Strom et al. | 1/1 |
| 7,469,284 B1 * | 12/2008 | Dubrovsky et al. | 709/223 |
| 2002/0114285 A1 | 8/2002 | LeBlanc | |
| 2005/0091351 A1 | 4/2005 | Badovinaitz et al. | |
| 2005/0114339 A1 | 5/2005 | Challener et al. | |
| 2006/0036724 A1 * | 2/2006 | Iizuka et al. | 709/223 |
| 2007/0033282 A1 * | 2/2007 | Mao et al. | 709/226 |
| 2008/0215813 A1 * | 9/2008 | Igarashi et al. | 711/114 |

OTHER PUBLICATIONS

Kephart, Jeffrey O., et al., The Vision of Autonomic Computing, IEEE Computer Society, Jan. 2003, pp. 41-50.

* cited by examiner

*Primary Examiner* — Barbara Burgess
(74) *Attorney, Agent, or Firm* — Charles L. Moore; Moore & Van Allen PLLC

(57) ABSTRACT

A method to match an autonomic manager with a manageable resource may include using a management style profile to match the autonomic manager with the manageable resource. The method may also include validating that the autonomic manager can manage the manageable resource using a defined management style of the autonomic manager.

25 Claims, 5 Drawing Sheets

FIG. 3A

| ELEMENT | CAPABILITIES 300 | |
|---|---|---|
| | MANAGEABLE RESOURCE 306 | AUTONOMIC MANAGER 308 |
| wsrmd: PROPERTY | X | |
| acrmd: OPERATION | X | |
| acrmd: EVENT | X | |
| acrmd: CALLOUT | | X |

| ELEMENT | REQUIREMENTS 304 | |
|---|---|---|
| | MANAGEABLE RESOURCE 312 | AUTONOMIC MANAGER 314 |
| wsrmd: PROPERTY | | X |
| acrmd: OPERATION | | X |
| acrmd: EVENT | | X |
| acrmd: CALLOUT | X | |

310

MATCHING AN AUTONOMIC MANAGER WITH A MANAGEABLE RESOURCE

CROSS-REFERENCE TO RELATED APPLICATIONS

The present application is a continuation of prior U.S. patent application Ser. No. 11/535,680, filed Sep. 27, 2006, the contents of which are incorporated herein by reference.

BACKGROUND OF THE INVENTION

The present invention relates to autonomic computing or similar systems or operations, and more particularly to matching an autonomic manager with a manageable resource using a management style profile or similar information.

Autonomic computing technology is based on creating system components that may be referred to as autonomic managers which can perform actions that make systems more self-managing. An autonomic manager may perform a closed autonomic computing loop, such as a monitor-analyze-plan-execute (MAPE) loop or the like. Accordingly, the autonomic computing loop may involve the operations of monitoring a manageable entity, analyzing any data or information received, planning any actions as a result of the analysis and executing the actions. An autonomic manager may be responsible for managing one or more manageable resources, such as applications, storage means, servers or other entities that may be managed.

Different autonomic mangers may use different management styles, and manageable resources may need to be managed by autonomic managers with a specific management style. Accordingly, an autonomic manager should be matched with a manageable resource before the autonomic manager is assigned to manage the resource. Typically, the matching is done manually using information that may not lead to the best match. This may result in incompatibility between managers and resources, runtime errors, degraded management support and the like.

BRIEF SUMMARY OF THE INVENTION

In accordance with an embodiment of the present invention, a method to match an autonomic manager with a manageable resource may include using a management style profile to match the autonomic manager with the manageable resource. The method may also include validating that the autonomic manager can manage the manageable resource using a defined management style of the autonomic manager.

In accordance with another embodiment of the present invention, the method may include determining if each requirement of the manageable resource matches a capability of the autonomic manager; and determining if each requirement of the autonomic manager matches a capability of the manageable resource. The method may also include assigning the autonomic manager to the manageable resource in response to at least each requirement of the manageable resource matching a capability of the autonomic manager and each requirement of the autonomic manager matching a capability of the manageable resource. An orchestrating manager may be advised that the autonomic manager is managing the manageable resource in response to at least each requirement of the manageable resource matching a capability of the autonomic manager and each requirement of the autonomic manager matching a capability of the manageable resource.

In accordance with another embodiment of the present invention, a preliminary analysis may be performed to determine which autonomic manager of a plurality of autonomic managers to assign to the manageable resource. Another, dynamic analysis may be performed in response to assignment of the autonomic manager to the manageable resource to confirm that the assigned autonomic manager can manage the manageable resource. The dynamic analysis may include obtaining information from a group of sources that may include at least the manageable resource. The information may include a web service-resource metadata descriptor (WS-RMD) document, a web service descriptor language (WSDL) document and any other information that may be helpful in matching the autonomic manager with the manageable resource.

In accordance with a further embodiment of the present invention, a method to match an autonomic manager with a manageable resource may include analyzing a plurality of capabilities and requirements of the autonomic manager and the manageable resource and determining that the autonomic manager can manage the manageable resource in response to a match between the capabilities and requirements of the autonomic manager and the manageable resource. The method may also include setting a management style of the autonomic manager and starting to manage the manageable resource in response to determining that the autonomic manager can manage the manageable resource.

In accordance with other embodiments of the present invention, a system and a computer program product may be provided to match an autonomic manager with a manageable resource.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 3A is an exemplary representation of capabilities of an autonomic manager and a manageable resource as they may appear in a metadata document in accordance with an embodiment of the present invention.

FIG. 3B is an exemplary representation of requirements of an autonomic manager and a manageable resource as they may appear in a metadata document in accordance with an embodiment of the present invention.

DETAILED DESCRIPTION OF THE INVENTION

Figure 1:
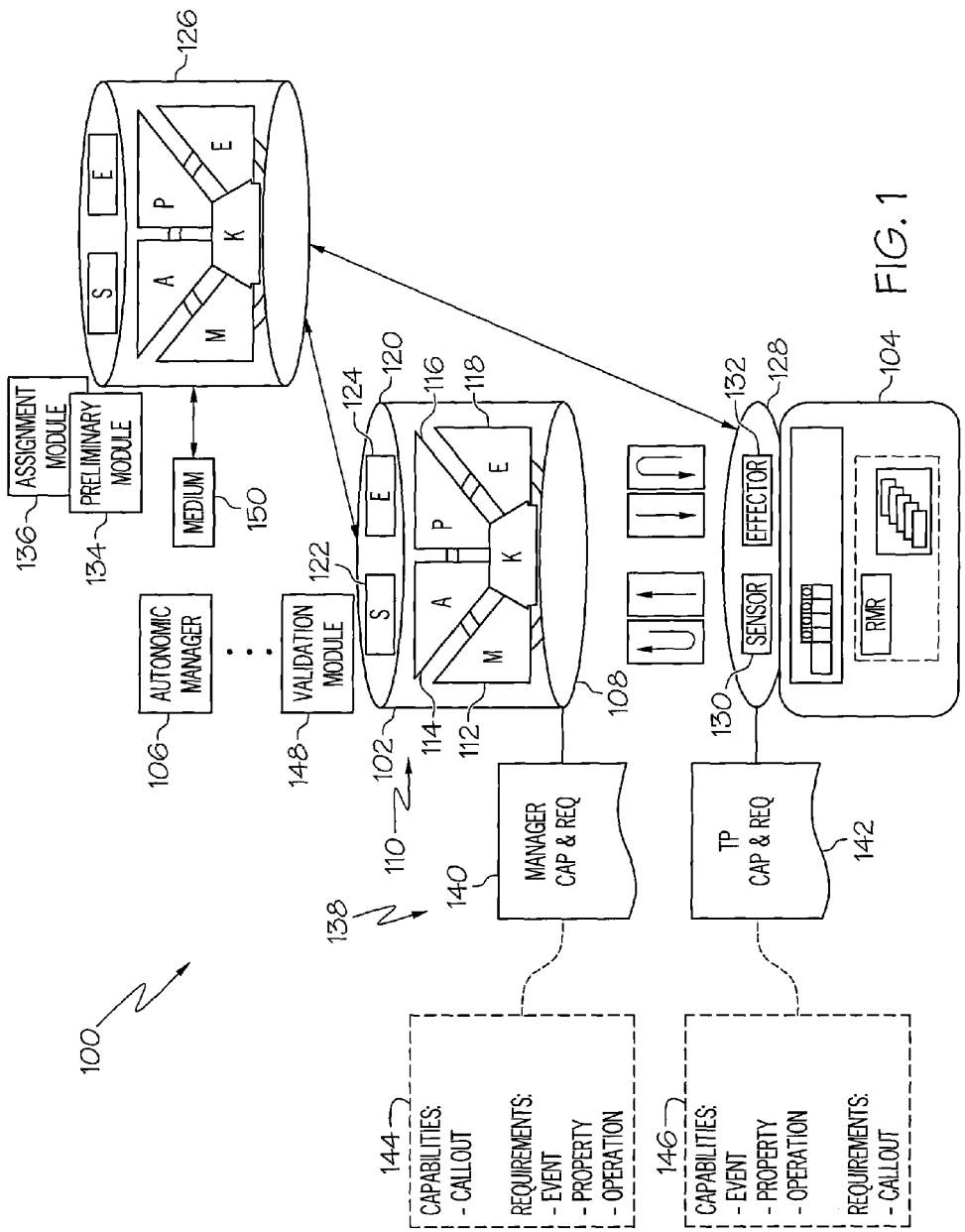
FIG. 1 is a block diagram of an exemplary system adapted to match an autonomic manager with a manageable resource in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium, for example medium 150 in FIG. 1, having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or block.

FIG. 1 is a block diagram of an exemplary autonomic system 100 adapted to match an autonomic manager 102 with a manageable resource 104 in accordance with an embodiment of the present invention. Matching the autonomic manager 102 with the manageable resource 104 may be done either at the time the system 100 is designed or dynamically at runtime. The system 100 may include a plurality of autonomic managers 102 and 106 that may be similar but may have different management styles. Autonomic managers may support management styles that define the capabilities and requirements for managing a manageable resource, such as manageable resource 104 or set of manageable resources.

A management style may be either hands-on, hands-off, or a combination of both. An autonomic manager with a hands-on management style may poll the resources being managed to determine when an action is needed. An autonomic manager with a hands-off management style may involve the autonomic manager delegating responsibility to the manageable resources to notify the autonomic manager when events occur. An autonomic manager with both management styles may delegate responsibility for certain events to a manageable resource, but some events may be handled directly by the autonomic manager. As an example, the manageable resource may send basic events like severe error conditions, but the autonomic manager may poll metrics to determine if any have passed a threshold defined by a policy associated with the autonomic manager.

An exemplary architecture for an autonomic system, autonomic manager and manageable resource will be described briefly herein for purposes of understanding of the present invention. A more detail description of autonomic computing is provided in "An Architectural Blueprint for Autonomic Computing" Third Edition, June 2005, available from the IBM Corporation.

The autonomic manager 102 may include a manager side interface 108 to monitor and control the manageable resource 104. The autonomic manager 102 may also include an autonomic computing loop 110, MAPE loop or process. The autonomic computing loop 110 may include a monitor function or module 112, an analyze function or module 114, a plan function or module 116 and an execute function or module 118.

The monitor function 112 may provide mechanisms that collect, aggregate, filter, correlate and report details, such as metrics, topologies or the like collected from the manageable resource 104.

The analyze function 114 may provide mechanisms that model complex situations, for example, time-series forecasting, queuing models or other models of situations. These analyze mechanisms allow the autonomic manager 102 to learn about the environment and help predict future situations.

The plan function 116 may provide mechanisms that construct the actions needed to achieve goals and objectives. The execute function 118 may provide the mechanisms that control the execution of a plan, which may involve executing operations using the manageable resource 104. These four parts 112-118 work together to provide the control loop functionality. The four parts 112-118 communicate and collaborate with one another and exchange appropriate knowledge and data.

The autonomic manager 102 may also include a manageability interface or interfaces 120. The manageability interface 120 may include a sensor interface 122 and an effector interface 124. The sensor interface 122 and effector interface 124 may permit the autonomic manager 102 to be monitored and controlled by another entity, such as an orchestrating autonomic manager 126 or the like. The orchestrating manager 126 may be similar to the autonomic manager but may be adapted to control a plurality of other autonomic managers 102 and 106 in the system 100. The manageability interface 120 may permit other autonomic managers and other components in the system 100 or distributed infrastructure to use the autonomic manager 102. Using manageability interfaces for the system 100 or distributed infrastructure components enables these components to be composed together in a manner that is transparent to the manageable entities. For example, the orchestrating autonomic manager 126 can use the manageability interfaces of touchpoint autonomic managers 102 to accomplish its management functions.

The manageable resource 104 may be any sort of manageable entity, such as an application, a storage device or means, a server or similar entity. The manageable resource 104 may include a manageability interface 128. The manageability interface 128 may include a sensor interface 130 and an effector interface 132. The sensor interface 130 and effector interface 132 may be similar to the sensor interface 122 and effector interface 124 of the autonomic manager 102. Accordingly, the sensor interface 130 and the effector interface 132 may permit the manageable resource 104 to be monitored and controlled by another entity, such as the autonomic manager 102 assigned to manage the manageable resource 104.

In accordance with an embodiment of the present invention, the orchestrating autonomic manager 126 may be adapted or may include a module 134 to perform a preliminary analysis to determine which of a plurality of autonomic managers 102 and 106 to preliminarily assign or match with the manageable resource 104. The orchestrating manager 126 may assign the autonomic manager 102 to manage the manageable resource 104 based on the results from the preliminary analysis. The orchestrating manager 126 may also include an assignment module 136 or function to assign the autonomic manager 102 to the manageable resource 104 based on the preliminary analysis. The assignment module 136 or assignment function may be part of the preliminary analysis 134.

As described in more detail with reference to FIG. 2, the preliminary analysis 134 may use a management style profile 138 or similar information to match the autonomic manager 102 to the manageable resource 104. The management style profile 138 may include a set of metadata documents 140 associated with the autonomic manager 102 and a second set of metadata documents 142 associated with the manageable resource 104. The set of metadata documents 140 associated with the autonomic manager 102 may include a plurality of capabilities and requirements 144 of the autonomic manager 102. Similarly, the set of metadata documents 142 associated with the manageable resource 104 may include a plurality of capabilities and requirements 146 of the manageable resource 104. Examples of the capabilities and requirements 144 and 146 may include callout, event, property and operation capabilities and requirements. Callout is used by an autonomic manager to indicate the specific autonomic manager operations that the management resource could use (this is an autonomic manager capability). Callout can also be used by a manageable resource to indicate the callout type of operations that must be supported by its manager (this is a manageable resource requirement). Event can be used by an autonomic manager to indicate the events that it consumes (requirement), and used by a manageable resource to specify the events that it can produce (capability). Property is used by an autonomic manager to specify the resource properties that it requires a manageable resource to support (requirement), and used by a manageable resource to indicate the properties that it supports (capabilities). Operation can be used by an autonomic manager to specify the operations that the autonomic manager expects it can use when interacting with a manageable resource (requirement), and used by a manageable resource to indicate the operations that it supports (capability). As will be described in more detail with respect to FIG. 2, the autonomic manager 102 may be matched or assigned to the manageable resource 104 in response to matching the capabilities and requirements between the autonomic manager 102 and the manageable resource 104.

The autonomic manager 102 may include a validation module 148 or dynamic analysis module to validate that the autonomic manager 102 can manage the manageable resource 104 using a defined management style of the autonomic manager 102. Accordingly, the autonomic manager 102 may be adapted or may include the module 148 to perform another analysis to match the plurality of capabilities and requirements 144 of the autonomic manager 102 and capabilities and requirements 146 of the manageable resource 104. A determination may be made whether the autonomic manager 102 can manage the manageable resource 104 based on a match between the capabilities and requirements of the autonomic manager 102 and the manageable resource 104.

Figure 2A:
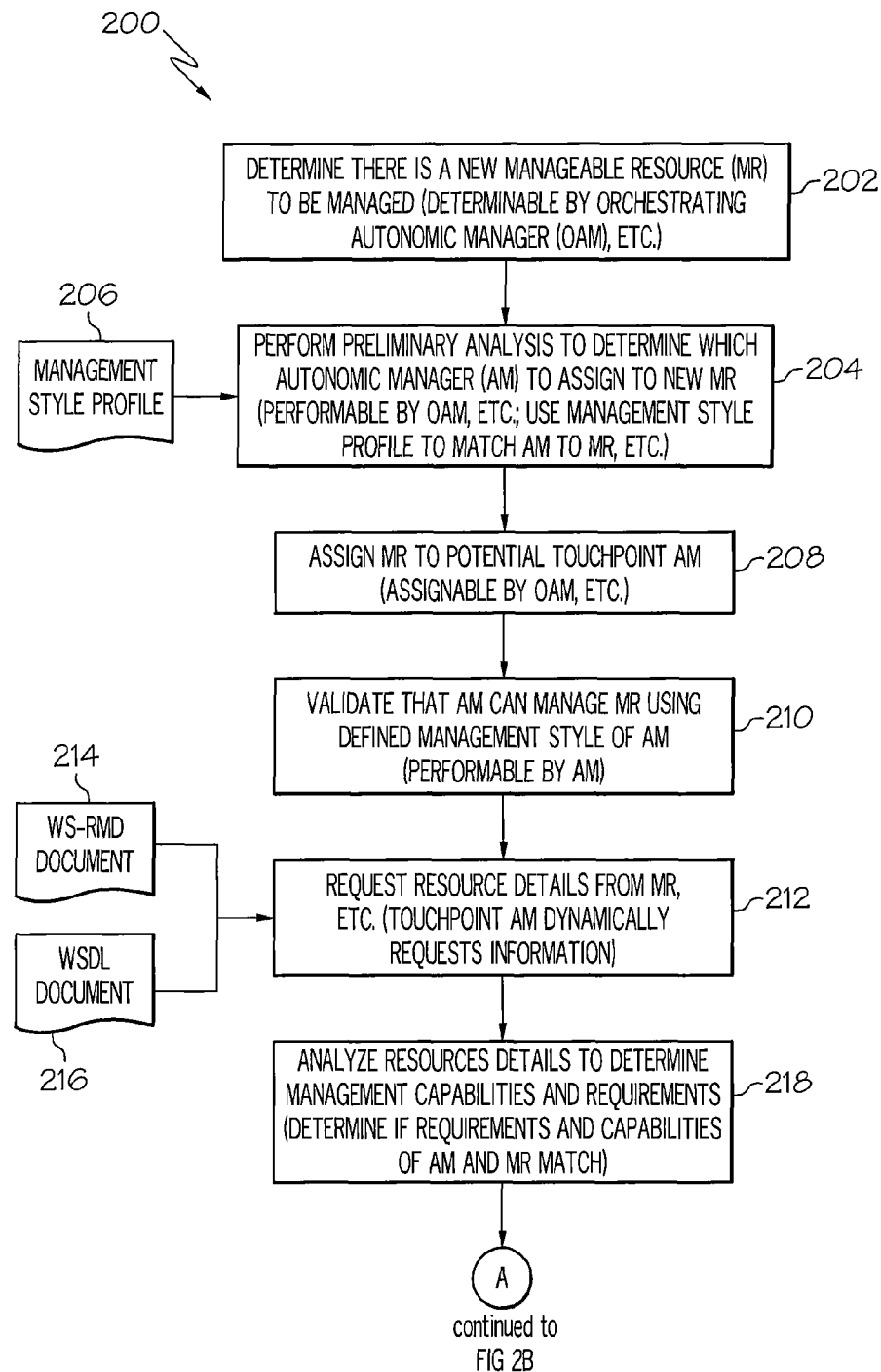
FIGS. 2A and 2B (collectively FIG. 2) are a flow chart of an example of a method to match an autonomic manager with a manageable resource in accordance with an embodiment of the present invention.
Figure 2B:
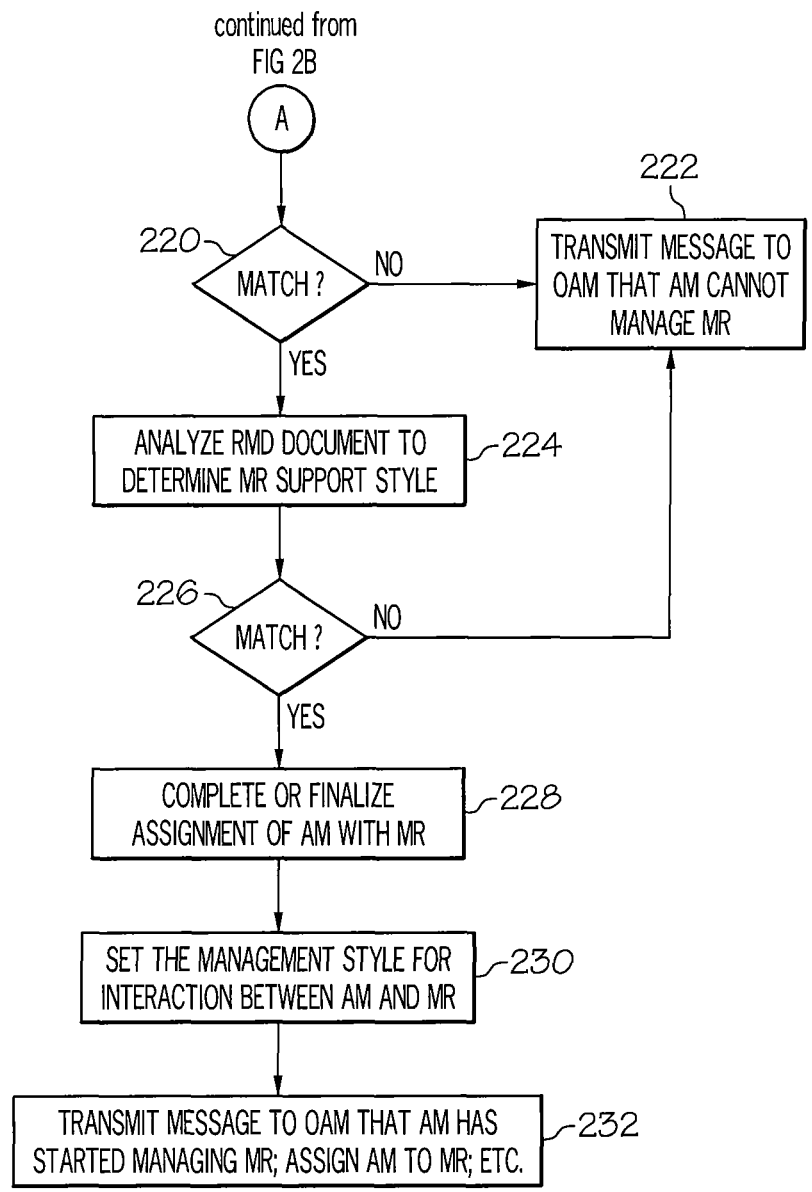

FIGS. 2A and 2B (collectively FIG. 2) are a flow chart of an example of a method 200 to match an autonomic manager (AM) with a manageable resource (MR) in accordance with an embodiment of the present invention. The method 200 may be embodied in the system 100 of FIG. 1. The method 200 or portions of the method 200 may be embodied in the medium 150 which may be any sort of medium or computer program product embodying computer usable program code to perform the method 200.

In block 202, a determination may be made if there is a new manageable resource (MR) to be managed. The determination may be made by an orchestrating autonomic manager (OAM) similar to orchestrating manager 126 of FIG. 1 or some other managing entity.

In block 204, a preliminary analysis may be performed to determine which autonomic manager (AM) of a plurality of autonomic managers to assign to the new manageable resource (MR). The orchestrating manager (OAM) or other managing entity may perform the preliminary analysis. The analysis may involve using a management style profile 206 or other information related to compatibility between the autonomic manager and the manageable resource to match the autonomic manager (AM) to the manageable resource (MR). As previously discussed, the management style profile 206 may include a set of metadata documents associated with the autonomic manager (AM) and a set of metadata documents associated with the manageable resource (MR). The metadata documents may include capabilities and requirements of the autonomic manager (AM) and the manageable resource (MR) which can be analyzed and matched to determine whether the autonomic manager (AM) can manage the manageable resource (MR) using a defined management style of the autonomic manager (AM). The defined management style may be a hands-on style, a hands-off style or some combination similar to that previously discussed.

In block 208, the manageable resource (MR) may be potentially or preliminarily assigned to a touchpoint autonomic manager (AM) based on the preliminary analysis. The assignment may be made by the orchestrating manager (OAM) or some other managing entity. The autonomic manager may be referred to as a touchpoint autonomic manager because the autonomic manager works directly with the manageable resource through the resources touchpoints or sensor and effector interfaces, such as sensor and effector interfaces 130 and 132 in FIG. 1. The autonomic manager implements sensor and effector behavior in the manageable resource's manageability mechanism or interface 128 in FIG. 1.

In block 210 the method 200 or system 100 may validate that the autonomic manager (AM) can manage the manageable resource (MR) using the management style of the autonomic manager (AM). The remaining blocks or elements of the method 200 may be involved in the validation that the autonomic manager can manage the manageable resource using the defined management style of the autonomic manager. The validation process or at least portions of the validation process may be embodied in the autonomic manager as a module or component, such as module 148 in FIG. 1.

In block 212, resource details or information may be requested from at least the manageable resource. The touchpoint autonomic manager or assigned autonomic manager may request the resource information. The information obtained in response to the request may include a web service-resource metadata descriptor (WS-RMD) document 214, a web service descriptor language (WSDL) document 216, any associated extensible mark-up language (XML) schema documents or similar documents or information associated with the manageable resource.

The WS-RMD is an evolving standard which may serve two purposes. First, WS-RMD provides additional information about the resource properties of a WS-Resource. Second, the WS-RMD may provide information about the value restrictions of the resource properties in the resource properties document for the WS-Resource. A WS-Resource is a Web service through which a resource may be accessed. WSDL (Web Service Description Language) is an XML language for describing Web services.

Referring also to FIGS. 3A and 3B, FIG. 3A is an exemplary representation 300 of capabilities 302 of an autonomic manager and a manageable resource as they may appear in a metadata document or the like in accordance with an embodiment of the present invention. FIG. 3B is an exemplary representation 304 of requirements 306 of an autonomic manager and a manageable resource as they may appear in a metadata document in accordance with an embodiment of the present invention. A manageable resource including a particular capability of the capabilities 302 may be indicated by an "X" in the "Manageable Resource" column 306 corresponding to a row for the associated capability 302. The autonomic manager including one or more of the capabilities 302 may be indicated by an "X" in the "Autonomic Manager" column 308 corresponding to the row of the associated capability 302.

Similarly, in FIG. 3B the manageable resource including a particular requirement of the requirements 310 may be indicated by an "X" in the "Manageable Resource" column 312 corresponding to a row of the associated requirement 310. The autonomic manager including a particular requirement of the requirements 310 may be indicated by an "X" in the "Autonomic Manager" column 314 corresponding to the row of the associated requirement 310.

Examples of the capabilities may include wsrmd: Property, acrmd: Operation, acrmd: Event, acrmd: Callout or the like. Similar to that previously described, wsrmd refers to a web service-resource metadata descriptor document and acrmd refers to an autonomic computing resource metatdata descriptor document. The prefixes wsrmd and acrmd indicate where the XML elements may be found for the Property, Operation, Event and Callout XML elements. For example, the namespace value for wsrmd may be defined in the WS-Resource Metadata Descriptor specification as http://docs.oasis-open.org/wsrf/rmd-1. The namespace for acrmd is defined as http://www.ibm.com/xlmns/prods/autonomic/rmd. The XML elements associated with this namespace are extensions to the metadata that is defined in the WS-Resource Metadata Descriptor specification.

Returning to FIG. 2, in block 218, the resource details may be analyzed to determine management capabilities and requirements of the autonomic manager and the manageable resource. The analysis may include determining if the requirements and capabilities of the autonomic manager and the manageable resource match.

Figure 4:
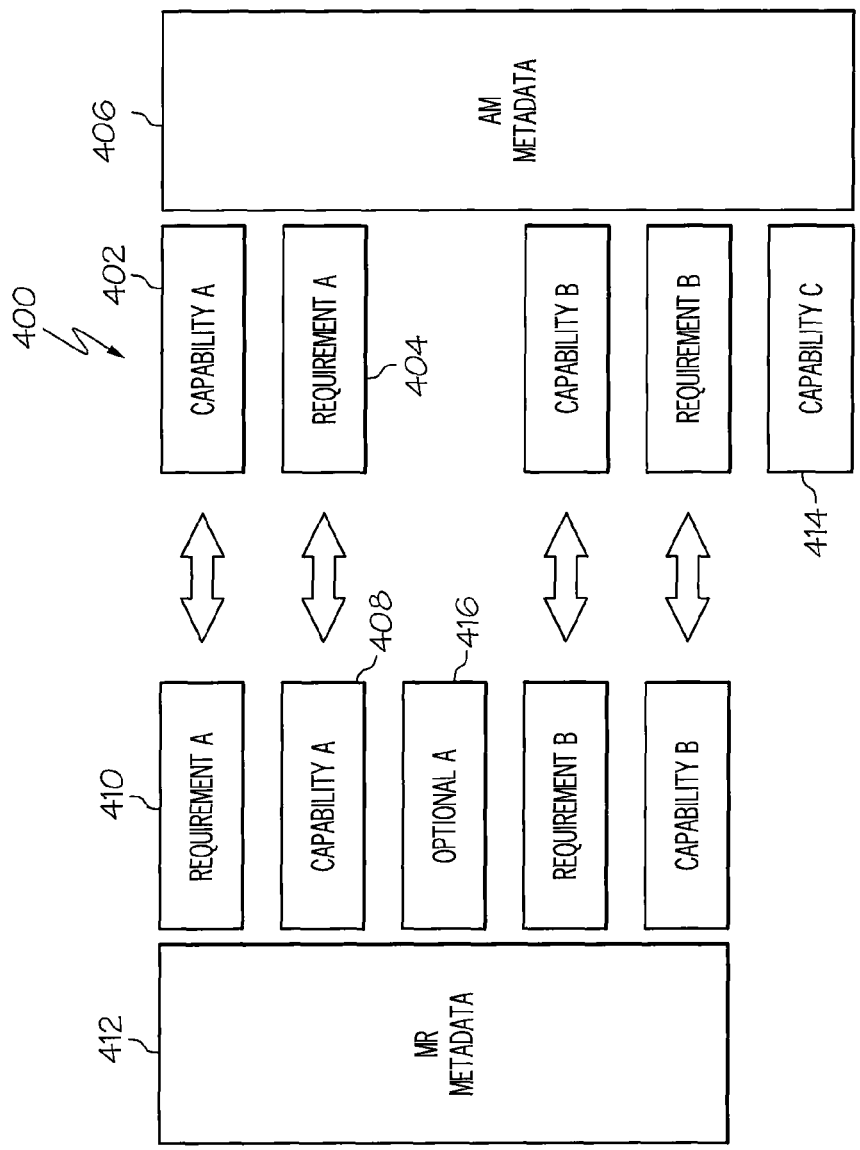
FIG. 4 is an exemplary illustration of matching capabilities and requirements of an autonomic manager and a manageable resource in accordance with another embodiment of the present invention.

Referring also to FIG. 4, FIG. 4 is an exemplary illustration 400 of matching capabilities and requirements of an autonomic manager (AM) and a manageable resource (MR) in accordance with another embodiment of the present invention. As previously discussed, the autonomic manager (AM) capabilities 402 and requirements 404 may be defined in a metadata document 406 associated with the autonomic manager (AM). Similarly, the capabilities 408 and requirements 410 of the manageable resource may be defined in a metadata document 412 associated with the manageable resource (MR). The capabilities 402 of the autonomic manager may then be matched with requirements 410 of the manageable resource and the capabilities 408 of the manageable resource may be matched with the requirements 404 of the autonomic manager. If the autonomic manager has a capability 414 that is not matched to a requirement of the manageable resource or either the manageable resource or autonomic manager include an option 416, the autonomic manager can still be assigned to manage the manageable resource. However, if either of the manageability resource or the autonomic manager have a requirement which cannot be matched, the autonomic manager cannot manage the manageable resource. Accordingly, referring back to FIG. 2, if there in no match in block 220, the method 200 may advance to block 222 and a message may be transmitted to the orchestrating manager or other managing entity that the autonomic manager (AM) cannot manage the manageable resource (MR). The message may be sent by the autonomic manager.

If a determination is made in block 220 that all requirements of the manageable resource and autonomic manager match from the analysis in block 218, the method 200 may advance to block 224. In block 224, the resource metadata description (RMD) document 214 may be analyzed to determine a support style of the manageability resource. A determination may be made in decision block 226 if there is a match between the support style of the manageability resource and the management style of the autonomic manager. As previously discussed, depending upon the management style profile of the autonomic manager, the management style may be hands-on, hands-off, or some combination of both. If there is no match in block 226, the method 200 may advance to block 222 and a message may be transmitted to the orchestrating autonomic manager (OAM) that the autonomic manager cannot manage the manageable resource.

If there is a match in block 226, the method 200 may advance to block 228. In block 228, the assignment of the autonomic manager to the manageable resource may be completed or finalized. In block 230, the management style for interaction between the autonomic manager and the manageability resource may be set. The management style of the autonomic manager may be set to a hands-on style, a hands-off style or a combination thereof depending upon the results of the analysis in block 224 and if the autonomic manager is capable of operation in other than one management style. The management style of the autonomic manager may be automatically set by the autonomic manager.

In block 232, a message may be transmitted to the orchestrating autonomic manager that the autonomic manager has started managing the manageable resource or a similar message to this effect may be sent.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to match an autonomic manager with a manageable resource, the method comprising:
   determining, by a processor associated with an orchestrating autonomic manager, that there is a manageable resource that needs to be managed;
   performing a preliminary analysis, by the processor associated with the orchestrating autonomic manager, to determine an autonomic manager of a plurality of autonomic managers to preliminarily assign to the manageable resource in response to determining that there is the manageable resource that needs to be managed;
   using a management style profile to determine, by the processor associated with the orchestrating autonomic manager, the autonomic manager of the plurality of autonomic managers to assign to the manageable resource;
   preliminarily assigning, by the processor associated with the orchestrating autonomic manager, the autonomic manager of the plurality of autonomic managers to manage the manageable resource based on the preliminary analysis;
   validating, that the autonomic manager can manage the manageable resource using a defined management style of the autonomic manager after preliminarily assigning the autonomic manager to manage the manageable resource by the orchestrating autonomic manager, wherein the autonomic manager and the manageable resource each comprise at least one requirement and at least one capability, validating that the autonomic manager can manage the manageable resource comprises:
      matching each requirement of the autonomic manager to the at least one capability of the manageable resource; and
      matching each requirement of the manageable resource to the at least one capability of the autonomic manager; and
   finalizing assignment, by the processor associated with the orchestrating autonomic manager, of the autonomic manager to the manageable resource in response to each requirement of the manageable resource matching the at least one capability of the autonomic manager and each requirement of the autonomic manager matching the at least one capability of the manageable resource.

2. The method of claim 1, further comprising:
   determining if each requirement of the manageable resource matches the at least one capability of the autonomic manager; and
   determining if each requirement of the autonomic manager matches the at least one capability of the manageable resource.

3. The method of claim 2, further comprising advising the orchestrating autonomic manager that the autonomic manager is managing the manageable resource in response to each requirement of the manageable resource matching the at least one capability of the autonomic manager and each requirement of the autonomic manager matching the at least one capability of the manageable resource.

4. The method of claim 1, further comprising setting a desired management style of the autonomic manager in response to a determination that the autonomic manager can manage the manageable resource.

5. The method of claim 4, wherein setting the desired management style of the autonomic manager comprises:

calling any manageable resource operations that allow the autonomic manager to set any events the manageable resource should send to the autonomic manager; and designating the autonomic manager callout operations useable by the manageable resource.

6. The method of claim 1, further comprising performing a dynamic analysis in response to assignment of the autonomic manager to the manageable resource.

7. The method of claim 6, wherein performing the dynamic analysis comprises obtaining information from a group of sources comprising at least the manageable resource.

8. The method of claim 7, wherein obtaining the information comprises: obtaining a web service-resource metadata descriptor (WS-RMD) document; and obtaining a web service descriptor language (WSDL) document.

9. The method of claim 1, wherein using the management style profile comprises using a set of metadata documents.

10. The method of claim 1, further comprising:
analyzing a plurality of capabilities and requirements of the autonomic manager and the manageable resource; and
determining that the autonomic manager can manage the manageable resource in response to a match between the capabilities and requirements of the autonomic manager and the manageable resource.

11. The method of claim 1, further comprising:
setting a management style of the autonomic manager; and
starting to manage the manageable resource in response to determining that the autonomic manager can manage the manageable resource.

12. The method of claim 1, wherein using the management style profile comprises using a set of metadata documents, wherein using the set of metadata documents comprises:
using a first set of metadata documents associated with the manageable resource, wherein the first set of metadata documents comprise a plurality of capabilities and requirements of the manageable resource;
using a second set of metadata documents associated with the autonomic manager, wherein the second set of metadata documents comprise a plurality of capabilities and requirements of the autonomic manager.

13. A method to match an autonomous manager with a manageable resource, comprising:
determining, by a processor associated with an orchestrating autonomic manager, that there is a manageable resource that needs to be managed;
performing a preliminary analysis, by the processor associated with the orchestrating autonomic manager, to determine which autonomic manager of a plurality of autonomic managers to preliminarily assign to manage the manageable resource based on a management style profile of the autonomic manager in response to determining that there is the manageable resource that needs to be managed;
preliminarily assinin, bprocessor associated with the orchestrating autonomic manager, the autonomic manager of the plurality of autonomic managers to manage the manageable resource based on the management style profile of the autonomic manager;
analyzing a plurality of capabilities and requirements of the autonomic manager and the manageable resource after preliminarily assigning the autonomic manager to manage the manageable resource by the orchestrating autonomic manager;
determining, by the processor associated with the orchestrating autonomic manager, that the autonomic manager can manage the manageable resource in response to a match between the capabilities and requirements of the autonomic manager and the manageable resource;
finalizing assignment, by the processor associated with the orchestrating autonomic manager, of the autonomic manager to manage the manageable resource in response to each requirement of the manageable resource matching at least one capability of the autonomic manager and each requirement of the autonomic manager matching at least one capability of the manageable resource;
setting a management style of the autonomic manager; and
starting to manage the manageable resource in response to determining that the autonomic manager can manage the manageable resource.

14. The method of claim 13, further comprising using the management style profile to match the autonomic manager with the manageable resource.

15. The method of claim 13, further comprising using metadata to determine a match between the capabilities and requirements of the autonomic manager and the manageable resource.

16. The method of claim 13, further comprising:
performing a preliminary analysis to determine which autonomic manager of the plurality of autonomic managers to assign to the manageable resource; and
performing another analysis in response to assignment of the autonomic manager to the manageable resource.

17. A system to match an autonomic manager with a manageable resource, comprising:
a processor associated with an orchestrating autonomic manager, the orchestrating autonomic manager determining that there is a manageable resource that needs to be managed and performing a preliminary analysis to determine an autonomic manager of a plurality of autonomic managers to assign to the manageable resource in response to determining that there is a manageable resource that needs to be managed;
a module operable on the processor associated with the orchestrating autonomic manager that uses a management style profile to determine which autonomic manager of a plurality of autonomic managers to assign to the manageable resource, the orchestrating autonomic manager preliminarily assigning the autonomic manager of the plurality of autonomic managers to manage the manageable resource based on the management style profile of the autonomic manager;
a module to validate that the autonomic manager can manage the manageable resource using a management style of the autonomic manager after preliminarily assigning the autonomic manager to manage the manageable resource by the orchestrating autonomic manager, wherein the autonomic manager and the manageable resource each comprise at least one requirement and at least one capability, the module to validate that the autonomic manager can manage the manageable resource comprises:
a module to match each requirement of the autonomic manager to the at least one capability of the manageable resource; and
a module to match each requirement of the manageable resource to the at least one capability of the autonomic manager; and wherein the system further comprises:
a module operable on the processor of the orchestrating autonomic manager that finalizes assignment of the autonomic manager to the manageable resource in response to each requirement of the manageable resource matching the at least one capability of the autonomic manager and each requirement of the autonomic manager matching the at least one capability of the manageable resource.

18. The system of claim 17, wherein the autonomic manager assigned to manage the manageable resource is adapted to validate that the autonomic manager can manage the manageable resource using the management style of the autonomic manager.

19. The system of claim 17, wherein the autonomic manager assigned to manage the manageable resource is adapted to perform an analysis to match the capabilities and requirements of the autonomic manager and the manageable resource and to determine whether the autonomic manager can manage the manageable resource based on a match between the capabilities and requirements of the autonomic manager and the manageable resource.

20. The system of claim 19, wherein the management style profile comprises a set of metadata documents.

21. The system of claim 20, wherein the set of metadata documents comprise: a first set of metadata documents associated with the manageable resource, wherein the first set of metadata documents comprise a plurality of capabilities and requirements of the manageable resource; and a second set of metadata documents associated with the autonomic manager, wherein the second set of metadata documents comprise a plurality of capabilities and requirements of the autonomic manager.

22. A computer program product to match an autonomic manager with a manageable resource, the computer program product comprising:
   a non-transitory computer usable storage medium having computer usable program code embodied therewith, wherein medium is not a signal the computer usable medium comprising:
   computer usable program code configured to determining that there is a manageable resource that needs to be managed;
   computer usable program code configured to perform a preliminary analysis to determine an autonomic manager of a plurality of autonomic managers to preliminarily assign to the manageable resource in response to determining that there is a manageable resource that needs to be managed;
   computer usable program code configured to use a management style profile to determine which autonomic manager of a plurality of autonomic managers to assign to the manageable resource;
   computer useable program code configured to preliminarily assign the autonomic manager of the plurality of autonomic managers to manage the manageable resource based on the preliminary analysis;
   computer usable program code configured to validate that the autonomic manager can manage the manageable resource using a defined management style of the autonomic manager after preliminarily assigning the autonomic manager to manage the manageable resource by an orchestrating autonomic manager, wherein the autonomic manager and the manageable resource each comprise at least one requirement and at least one capability;
   computer usable program code configured to match each requirement of the autonomic manager to the at least one capability of the manageable resource; and
   computer usable program code configured to match each requirement of the manageable resource to the at least one capability of the autonomic manager; and
   computer usable program code configured to finalize assignment of the autonomic manager to the manageable resource in response to each requirement of the manageable resource matching the at least one capability of the autonomic manager and each requirement of the autonomic manager matching the at least one capability of the manageable resource.

23. The computer program product of claim 22, further comprising computer usable program code configured to analyze the capabilities and requirements of the autonomic manager and the manageable resource and to determine that the autonomic manager can manage the manageable resource in response to a match between the capabilities and requirements of the autonomic manager and the manageable resource.

24. The computer program product of claim 22, further comprising computer usable program code configured to set a management style of the autonomic manager and to start to manage the manageable resource in response to determining that the autonomic manager can manage the manageable resource.

25. The computer program product of claim 22, further comprising computer usable program code configured to analyze a set of metadata comprising a plurality of capabilities and requirements of the autonomic manager and the manageable resource and to determine that the autonomic manager can manage the manageable resource in response to a match between the capabilities and requirements of the autonomic manager and the manageable resource.

* * * * *